United States Patent Office 3,507,796
Patented Apr. 21, 1970

3,507,796
ANTIBACTERIAL COMPOSITIONS
Jack G. Voss, Wyoming, Ohio, assignor to The Procter & Gamble Company, Cincinnati, Ohio, a corporation of Ohio
No Drawing. Continuation-in-part of application Ser. No. 489,739, Sept. 23, 1965. This application May 11, 1967, Ser. No. 637,625
Int. Cl. C11d 3/48; A61l 13/00, 23/00
U.S. Cl. 252—106                                           7 Claims

ABSTRACT OF THE DISCLOSURE

Antibacterial compositions consisting essentially of (1) specific chelating agents, (2) specific organic cation-forming compounds, (3) sufficient alkaline buffering salt to maintain the pH under usage conditions between 7 and 11, (4) specific zwitterionic detergents and (5) optionally, other compatable detergents and/or antibacterial agents; dilute aqueous solutions prepared from said compositions.

CROSS REFERENCE TO RELATED APPLICATION

This application is a continuation-in-part of applicant's copending application Ser. No. 489,739, filed Sept. 23, 1965, for Antibacterial Compositions, now abandoned.

BACKGROUND OF THE INVENTION

Field of the invention

This invention relates primarily to antibacterial compositions having a high degree of antibacterial activity. More particularly, this invention relates to alkaline antibacterial compositions consisting essentially of (a) specified chelating agents, (b) specified compounds capable of giving, in aqueous solution, specified types of organic cations, (c) alkaline buffering salts and (d) specified zwitterionic detergents.

The desirability of controlling or eradicating common disease-causing organisms on, e.g., the human body, textiles, hard surfaces, etc., is clearly accepted. It is highly desirable to provide compositions for controlling said organisms where said compositions are also effective cleaning agents.

It is an object of this invention to provide antibacterial compositions which are effective against a wide variety of organisms when the individual components are relatively ineffective at the concentrations used.

It is a more specific object of this invention to provide a composition that is an effective detergent composition and also an effective antibacterial composition.

SUMMARY OF THE INVENTION

The above objects and other objects which will hereinafter be apparent can be achieved by providing a composition consisting essentially of:

(I) From about 1 to about 50 parts by weight of the total composition of a chelating agent selected from the group consisting of:

(A) ethylenediaminetatraacetates;
(B) methylenediphosphonates;
(C) dibromomethylenediphosphonates;
(D) dichloromethylenediphosphonates;
(E) N-hydroxyethylethylenediaminetriacetates;
(F) diethylenetriaminepentaacetates;
(G) homopolymeric polymaleates having a molecular weight of from about 500 to about 175,000;
(H) 1,2, diaminocyclohexane-N,N'-tetraacetates;
(I) nitrilotriacetates;
(J) tripolyphosphates; and
(K) mixtures thereof, all in the form of their water soluble salts;

(II) From about 0.1 to about 5 parts by weight of the total composition of organic compounds which form organic cations in aqueous solution, selected from the group consisting of:

(A) amines having the formula

wherein R is an alkyl radical containing from about 8 to about 18 carbon atoms and having as substituents from 0 to about 1 additional amine group having the formula

said additional amine group being attached so that there is one alkyl moiety of at least about 8 carbon atoms containing no amine group as a substituent, and from 0 to about 2 halogen atoms and wherein each $R^1$ group is selected from the group consisting of hydrogen, alkyl groups containing from 1 to about 3 carbon atoms, mono halogen substituted alkyl groups containing from 1 to about 3 carbon atoms and hydroxy alkyl groups containing from 1 to about 3 carbon atoms, said halogen atoms and hydroxy groups being substituted on any of the carbon atoms in the alkyl groups;

(B) quaternary ammonium compounds having the formula

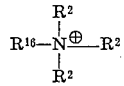

wherein $R^{16}$ is an alkyl radical containing from about 8 to about 18 carbon atoms and having as substituents from 0 to about 1 amine group having the formula

wherein $R^1$ has the definition hereinbefore given; from 0 to about 2 halogen atoms, and from 0 to about 1 additional quarternary ammonium group having the formula

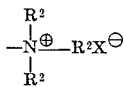

said amine group and said quaternary ammonium group being attached so that there is one alkyl moiety of at least about 8 carbon atoms containing no amine group or quaternary ammonium group as a substituent, and each $R^2$ group is selected from the group consisting of alkyl groups containing from 1 to about 3 carbon atoms, mono halogen substituted alkyl groups containing from 1 to about 3 carbon atoms, benzyl groups and hydroxyl alkyl groups containing from 1 to about 3 carbon atoms, said halogen atoms and said hydroxyl groups being substituted on any of the carbon atoms in the alkyl groups and wherein X is selected from the group consisting of iodide, bromide, methosulfate, ethosulfate and chloride anions;

(C) N-alkyl pyridinium halides wherein the alkyl group contains from about 8 to about 18 carbon atoms;
(D) N-alkyl piperidines wherein the alkyl group contains from about 8 to about 18 carbon atoms;
(E) N-alkyl alkylene diamines wherein the alkyl group contains from about 8 to about 18 carbon atoms and the alkylene group contains from about 2 to about 4 carbon atoms;

(F) sulfonium compounds having the formula

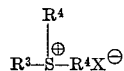

wherein $R^3$ is a hydrocarbon group containing from about 8 to about 18 carbon atoms, wherein each $R^4$ group is an alkyl group containing from 1 to about 3 carbon atoms, wherein X has the definition hereinbefore given (e.g., selected from the group consisting of iodide, bromide, chloride, methosulfate and ethosulfate anions);

(G) 1-alkyl-2-imino imidazolidines wherein the alkyl group contains from about 8 to about 18 carbon atoms;

(H) polyquaternary ammonium compounds having the formula:

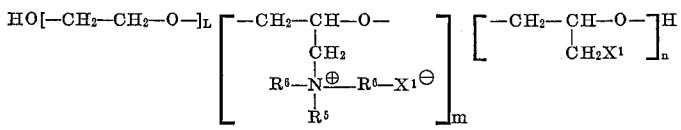

wherein $R^5$ is a hydrocarbon group containing from 1 to about 24 carbon atoms, wherein said $R^6$ group is a hydrocarbon group containing from 1 to about 4 carbon atoms, wherein $X^1$ is selected from the group consisting of chlorine, iodine, and bromine atoms, wherein L, m and n are integers such that L is an integer from 0 to about 50, the sum of m and n is from 2 to about 50, and the sum of m, n the number of carbon atoms in $R^5$ is greater than 12; and (I) mixtures thereof;

(III) From 0 to about 50 parts by weight of the composition of an alkaline buffering salt selected from the group consisting of ammonium, sodium, potassium or lithium (1) carbonates, (2) bicarbonates, (3) orthophosphates, (4) monohydrogen orthophosphates, (5) pyrophosphates, (6) tripolyphosphates, (7) metaphosphates, (8) hydroxides, (9) citrates, (10) acetates or (11) silicates having an $SiO_2$:$M_2O$ ratio of from about 1 to about 2.6 where M is sodium, potassium, or lithium and sufficient to maintain the pH of the composition at from about 7 to about 11 under usage conditions in aqueous solutions; and (IV) From about 1 to about 30 parts by weight of the total composition of a zwitterionic detergent selected from the group consisting of:

(A) compounds having the formula

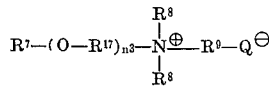

wherein $R^7$ is a hydrocarbon group containing from about 8 to about 18 carbon atoms, wherein $R^{17}$ is an alkylene group containing from 2 to 3 carbon atoms, wherein $n^3$ is a number from 0 to about 3, wherein each $R^8$ group is selected from the group consisting of alkyl groups and hydroxy alkyl groups, said groups containing from 1 to about 3 carbon atoms and the hydroxyl group being attached to any carbon atom in the alkyl group, wherein $R^9$ is a saturated alkylene group containing from 1 to about 4 carbon atoms and from 0 to 1 hydroxyl group attached to a secondary carbon atom, wherein Q is selected from the group consisting of

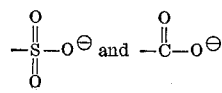

and $R^9$ contains no less than about 3 carbon atoms when Q is a sulfonate group;

(B) compounds having the formula

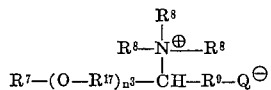

wherein $R^7$, $R^8$, $R^9$, $R^{17}$, $n^3$, and Q have the same definitions given hereinbefore, and wherein $R^9$ contains no less than about 2 carbon atoms when Q is a sulfonate group; and (C) mixtures thereof;

there being sufficient of each of the above components present so that under usage conditions in aqueous solutions there will be at least about 5 p.p.m. of Component I, about 0.5 p.p.m. of Component II and about 5 p.p.m. of Component IV.

BACTERIA

Bacterial cells are divided roughly into three parts. There is the outer cell wall, a semi-permeable cytoplasmic membrane lying just within the cell wall, and the interior of the cell which contains the vital constituents of the cell. Bacteria are divided into two major groups. One is the gram positive group and the other is the gram negative group. These groups differ in that the cell wall of the gram negative group is more complex and a much better barrier than is the cell wall of the gram positive group.

It has now been discovered that the combination of ingredients described hereinbefore is an effective antibacterial agent at low usage levels, both against gram positive bacteria and gram negative bacteria. This is totally unexpected even though certain of the individual components contained in the composition of this invention are capable of cidal action by themselves at higher usage levels. The combination of ingredients is effective at a much lower level than the individual components. The mechanism by which the individual components operate and cooperate is not completely known.

DESCRIPTION OF THE EMBODIMENT

The chelating agent

The chelating agent, although it is an ineffective antibacterial agent by itself, is a very important component in the compositions hereinbefore described. It is believed that the chelating agent increases the effectiveness of the attack on the cell walls of the bacteria by the other ingredients when used in conjunction with the other ingredients. It is thought that the chelating agent helps remove specific portions of the cell wall, such as the calcium portion. However, the effectiveness of the chelating agent appears to be only partly a function of its ability to sequester calcium ions. While all of the chelating agents which are operative are excellent calcium ion sequestrants, other effective calcium ion sequestrants which have structures similar to those which have been found to be effective have been shown to be inoperable in the present invention. Even within the list of chelating agents hereinbefore given, there is considerable variation in effectiveness as demonstrated in Example I. The most effective chelating agents are ethylenediaminetetraacetates, N-hydroxyethylethylenediaminetriacetates and diethylenediaminepentaacetates. Sodium tripolyphosphate is especially desirable since it also acts as an alkaline buffering salt.

The preferred cations for the chelating agents of this invention are sodium, potassium and ammonium cations. Ammonium cations include substituted ammonium cations such as mono-, di- and/or triethanolammonium cations,

The organic compounds which form organic cations

It is postulated that the effect of the organic compounds which provide organic cations results from the effect of the cations in modifying the structure of the cell walls of gram negative bacteria to permit the zwitterionic detergent, as hereinafter described, to penetrate to the cytoplasmic membrane. Although the other components of the compositions aid in the modification of the cell walls they are relatively ineffective without an organic cation present.

The organic compounds which form organic cations are of two types. The first type is an amine, e.g.,

which in aqueous solution forms the cation

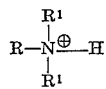

Organic compounds, A, D, E and G are of this type. The second type is a quaternized amine or sulfonium compound which already contains a cation which is associated with a anion (X or $X^1$) and which disassociates in an aqueous solution to form the cation, e.g.,

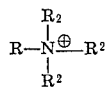

Organic compounds, B, C, F and H are of this type.

The preferred organic compounds are dodecyldimethylamine (hereinafter referred to as DDA), dimethyldodecyl sulfonium iodide, 2-dodecyl-1,3 bis-(trimethylammonio) propane dibromide, dimethyldodecyl-3(trimethylammonio) propylammonium dibromide, coconut trimethylammonium chloride, dodecyl trimethylammonium bromide, cetyltrimethylammonium bromide and cetyl pyridinium chloride.

There is considerable variation of effectiveness of the various organic cations as shown in Example II. Furthermore, there is a variation in effectiveness of cations depending upon the type or strain of bacteria. For example, an alkyldimethylbenzylammonium chloride in approximately as effective when used by itself as when it is used in the compositions of this invention against E. coli, Ps. aeruginosa and S. aureus. However, against P. mirabilis, an alkyldimethylbenzylammonium chloride is much more effective when used in the compositions of this invention than alone.

As mentioned hereinbefore, some of the organic cations, notably those of compounds B, C, F and H, are themselves effective antibacterial agents. The primary effect of this invention with respect to these effective antibacterial compounds is to lower the concentration at which their cations are effective. It is a special advantage of this invention, however, to provide mixtures of ingredients which are by themselves ineffective antibacterial agents, but which in combination are effective.

Mixtures of organic compounds which provide cations may be especially desirable for the purpose of increasing bactericidal effectiveness to a level above that provided by a single organic cation. Desirable compounds for use in mixtures include cetyl pyridinium chloride and cetyl trimethylammonium bromide.

The alkaline buffering salt

The primary purpose of the alkaline buffering salt is to keep the pH of the solutions of this invention in the neighborhood of from about 7 to about 11. A pH in this range can be maintained with 0 to about 50 parts by weight of the alkaline buffering salt; preferably at least 5 parts by weight is used. The antibacterial effectiveness of the compositions is enhanced in the more alkaline solutions. In fact, hydroxyl ions themselves contribute to antibacterial effectiveness. The preferred pH range is from about 8 to about 10. Lower pH's are less effective and if the pH is too high, the solutions are too likely to cause harmful effects on the skin. Also, high hydroxyl ion concentrations are in themselves antibacterial agents.

It will be noted that a chelating agent such as sodium tripolyphosphate, also has buffering ability and can be used for its chelating and/or buffering function either alone or in admixture with other chelating agents and/or buffering salts. The buffering salt is desirably a detergency builder.

The alkaline buffering salts of this invention are the ammonium and alkali metal salts of weak acids. Specific examples of alkaline buffering salts are the carbonates, bicarbonates, orthophosphates, monohydrogen orthophosphates, pyrophosphates, tripolyphosphates, metaphosphates, silicates having $SiO_2:M_2O$ ratios of from about 1 to about 2.6, preferably 1.6 to 2.6, wherein M is an alkali metal, hydroxides, citrates, and acetates of alkali metals, e.g. ammonium, sodium, potassium and lithium, and mixtures of such salts.

Preferred alkaline buffering salts are sodium carbonate and sodium tripolyphosphate. The sodium tripolyphosphate is a preferred alkaline buffering salt because of its detergency builder and chelating effects. On the other hand, the sodium carbonate is often preferred because of its cheapness and the fact that it gives a higher pH.

The zwitterionic detergent

The zwitterionic detergent serves two purposes. First, the detergent provides a cleaning effect which makes the detergent compositions of the present invention effective cleaning agents. Second, the switterionic detergent modifies the cytoplasmic membrane of the cell after it passes through the cell wall which has been modified by the other ingredients.

When the bacterium is a gram positive species, the zwitterionic detergent is an effective antibacterial agent by itself, but when the bacterium is a gram negative species, the switterionic detergent is relatively inefficient when used alone. However, in combination with the other ingredients of this invention the zwitterionic detergent is able to penetrate the cell walls of a gram negative organism to modify the cytoplasmic membrane and effect the death of the cells.

Zwitterionic detergents which are capable of killing gram positive bacteria when used alone have been found to be effective against gram negative bacteria when used in the compositions of this invention. Preferred zwitterionic detergents are:

3-(N,N-dimethyl-N-alkylammonio)-2-hydroxy propane-1-sulfonate, 3-(N,N-dimethyl-N-alkylammonio) propane-1-sulfonate, and 2-(N,N-dimethyl-N-alkylammonio) ethane-1-carboxylate wherein the alkyl groups are derived from coconut oil or contain large amounts of $C_{16}$ alkyl groups.

Other ingredients

In addition to the major ingredients hereinbefore described, the compositions of this invention can also contain other ingredients. For example, it has been discovered that, e.g., oxiodinium antibacterial agents are effective additives which greatly increase the killing power of the detergent compositions of this invention when used in amounts of from about 0.04 to about 1 parts by weight and sufficient to give a concentration in water of from about 1 p.p.m. to about 25 p.p.m.

These active antimicrobial compounds have the generic structural formula

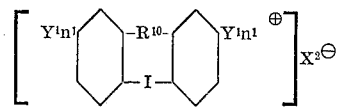

wherein $R^{10}$ is selected from the group consisting of oxygen, sulfur, and $—(CH_2)_{m1}—$, $m^1$ being an integer from 0 to 3; wherein each $Y^1$ represents a radical selected from the group consisting of chloro, bromo, iodo, fluoro and nitro groups; alkyl radicals containing up to 3 carbon atoms; chloro, fluoro, iodo, and bromo substituted alkyl radicals containing up to 3 carbon atoms the substituents being on any carbon atom; amino groups; and sulfamyl groups; each $n^1$ represents an integer selected from the group consisting of 0, 1 and 2, and when an $n^1$ is 2, the corresponding $Y^1$ radicals can be dissimilar and wherein $X^2$ is selected from the group consisting of sulfate, chloride, bisulfate, lactate, phosphate, iodide, phenate, 2,4,5-trichlorophenate, acetate, benzoate, citrate, bromide, fluoride, monohydrogen phosphate, dihydrogen phosphate, and nitrate anions.

Especially preferably compounds are the chloro derivatives such as bis(3,7-dichlorodibenz(be) (1,4)oxiodinium) sulfate, 3-chlorodibenz(be)(1,4)oxiodinium chloride, 2-chlorodibenz(be)(1,4)oxiodinium chloride, and 1-chlorodibenz(be)(1,4)oxiodinium chloride. The unsubstituted species, dibenz(be)(1,4)oxiodinium chloride, also is preferred. For example, 3-chloro-7-nitrodibenz(be)(1,4)oxiodinium bisulfate proved to be a very effective additive when combined with disodium ethylenediaminetetraacetate, dodecyldimethylamine, sodium carbonate, and 3-(N,N-dimethyl-N-hexadecylammonio)-2-hydroxy-propane-1-sulfonate.

The compositions of this invention also can contain other compatible detergents in amounts of from about 1 to about 20 parts by weight. Examples of compatible detergents include the following:

(A) a detergent having the formula

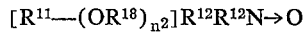

(amine oxide detergent) wherein $R^{11}$ is an alkyl group containing from about 10 to about 18 carbon atoms, from 0 to 1 methoxy group, and from 0 to about 2 hydroxy groups, $R^{18}$ is an alkylene group containing 2 or 3 carbon atoms, $n^2$ is a number from 0 to about 5, there being at least one moiety of $R^{11}$ which is an alkyl group containing at least about 10 carbon atoms and no substituent groups and each $R^{12}$ is selected from the group consisting of alkyl radicals and hydroxyalkyl radicals containing from 1 to about 3 carbon atoms;

(B) a detergent having the formula

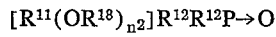

(phosphine oxide detergent) wherein $R^{11}$, $R^{18}$, $n^2$ and $R^{12}$ have the same definitions given hereinbefore;

(C) nonionic detergents produced by condensing ethylene oxide on a hydrophobic base, e.g., a detergent having the formula $R^{13}(C_2H_4O)_xH_y$ (nonionic detergent) wherein $R^{13}$ represents a hydrophobic base which is derived from a hydrophobic compound bearing at least one active hydrogen atom, said hydrophobic compounds preferably being selected from the group consisting of (1) alkanols containing from about 8 to about 20 carbon atoms, (2) alkyl phenols (including dialkyl phenols) wherein the alkyl group contains from about 6 to about 18 carbon atoms, (3) condensation products of propylene glycol and propylene oxide having a molecular weight of from about 1500 to about 1800, (4) fatty amides containing from about 10 to about 20 carbon atoms, (5) higher alkyl mercaptans containing from about 10 to about 20 carbon atoms, (6) condensation products of propylene oxide and ethylene diamine constituting from about 20% to about 60% by weight of the finished nonionic detergent molecule and (7) condensation products of fatty alcohols containing from about 10 to about 20 carbon atoms and from about 3 to about 8 propylene oxide units, and mixtures thereof, and wherein $x$ is an integer from about 4 to about 30 for (1), (2), (4) and (5), but not less than about 0.4 of the number of carbon atoms in the hydrophobic base, and wherein $x$ is sufficiently large to give the detergent a molecular weight of from about 2,000 to about 10,000 for (3), of from about 5,000 to about 11,000 for (6) and of from about 750 to about 1800 for (7) and wherein $y$ is an integer equal to the number of ethylene oxide chains formed by replacing the active hydrogen atoms on said hydrophobic compounds;

(D) a detergent having the formula

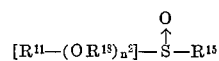

(sulfoxide detergent) wherein $R^{11}$, $R^{18}$, and $n^2$ have the same definitions given hereinbefore, and wherein $R^{15}$ is an alkyl radical containing from 1 to 3 carbon atoms and from one to two hydroxyl groups.

Specific examples of amine oxide detergents include:

dimethyldodecylamine oxide,
dimethyltetradecylamine oxide,
ethylmethyltetradecylamine oxide,
cetyldimethylamine oxide,
dimethylstearylamine oxide,
cetylethylpropylamine oxide,
diethyldodecylamine oxide,
diethyltetradecylamine oxide,
dipropyldodecylamine oxide,
bis-(2-hydroxyethyl)dodecylamine oxide,
bis-(2-hydroxyethyl)-2-dodecoxy-1-hydroxypropylamine oxide,
(2-hydroxypropyl)methyltetradecylamine oxide,
dimethyloleylamine oxide,
dimethyl-(2-hydroxydodecyl)amine oxide, and the corresponding decyl, hexadecyl and octadecyl homologs of the above compounds.

Specific examples of the phosphine oxide detergents include:

dimethyldodecylphosphine oxide,
dimethyltetradecylphosphine oxide,
ethylmethyltetradecylphosphine oxide,
cetyldimethylphosphine oxide,
dimethylstearylphosphine oxide,
cetylethylpropylphosphine oxide,
diethyldodecylphosphine oxide,
diethyltetradecylphosphine oxide,
dipropyldodecylphosphine oxide,
bis-(hydroxymethyl)dodecylphosphine oxide,
bis-(2-hydroxyethyl)dodecylphosphine oxide,
(2-hydroxypropyl)methyltetradecylphosphine oxide,
dimethyloleylphosphine oxide, and
dimethyl-(2-hydroxydodecyl)phosphine oxide and the corresponding decyl, hexadecyl and octadecyl homologs of the above compounds.

Specific examples of nonionic detergents include nonyl phenol condensed with either about 10 or about 30 moles of ethylene oxide per mole of phenol and the condensation products of coconut alcohol with an average of either about 5.5 or about 15 moles of ethylene oxide per mole of alcohol and the condensation product of about 15 moles of ethylene oxide with one mole of tridecanol.

Other examples include the well known detergents sold under the trade name "Pluronic" which are prepared by condensing propylene glycol with propylene oxide to form a hydrophobic base and then condensing said hydrophobic base with ethylene oxide, the hydrophobic base having a molecular weight of from about 1500 to about 1800 and the total molecule having a molecular weight of, e.g., 2000, 3000 and 8000.

Another group of suitable nonionic detergents are sold under the trade name of "Tetronic." These are prepared by condensing ethylenediamine with propylene oxide to form a hydrophobic group (molecular weight—from about 2500 to about 3000) and condensing this hydrophobic group with ethylene oxide to give a molecular weight of from about 5000 to about 11,000.

Other examples include dodecylphenol condensed with 12 moles of ethylene oxide per mole of phenol; dinonylphenol condensed with 15 moles of ethylene oxide per mole of phenol; dodecyl mercaptan condensed with 10 moles of ethylene oxide per mole of mercaptan; bis-(N-2-hydroxyethyl)lauramide; nonyl phenol condensed with 20 moles of ethylene oxide per mole of nonyl phenol; myristyl alcohol condensed with 10 moles of ethylene oxide per mole of myristyl alcohol; lauramide condensed with 15 moles of ethylene oxide per mole of lauramide; and di-iso-octylphenol condensed with 15 moles of ethylene oxide.

Specific examples of sulfoxide detergents include:

octadecyl methyl sulfoxide,
dodecyl methyl sulfoxide,
tetradecyl methyl sulfoxide,
3-hydroxytridecyl methyl sulfoxide,
3-methoxytridecyl methyl sulfoxide,
3-hydroxy-4-dodecoxybutyl methyl sulfoxide,
octadecyl 2-hydroxyethyl sulfoxide, and
dodecyl ethyl sulfoxide Semi-polar detergents, e.g., amine oxide detergents, are the most compatible detergents which can be used with the zwitterionic detergents. Anionic detergents in general are incompatible. However, certain anionic detergents such as the one described hereinafter are partially compatible. Nonionic ethoxylated detergents are partially compatible in amounts of from about 1% to about 20% by weight.

The specific anionic detergent which has also been found to be compatible is described more fully in the U.S. patent application of Phillip F. Pflaumer and Adriaan Kessler, Ser. No. 423,364 filed Jan. 4, 1965. This detergent, hereinafter referred to as "olefin sulfonate," comprises by weight from about 30% to about 70% of Component A, from about 20% to about 70% of Component B, and from about 2% to about 15% of Component C, wherein:

(a) said Component A is a quaternary mixture of double-bond positioning isomers of water soluble salts of alkene - 1 - sulfonic acids containing from about 10 to about 24 carbon atoms, said mixture of positional isomers including by weight about 10% to about 25% of an alpha-beta unsaturated isomer, about 30% to about 70% of a beta-gamma unsaturated isomer, about 5% to about 25% of a gamma-delta unsaturated isomer, and about 5% to about 10% of a delta-epsilon unsaturated isomer;

(b) said Component B is a mixture of water soluble salts of bifunctionally-substituted sulfur-containing saturated aliphatic compounds containing from about 10 to about 24 carbon atoms, the functional units being hydroxy and sulfonate radicals with the sulfonate radical always being on the terminal carbon and the hydroxyl radical being attached to a carbon atom at least two carbon atoms removed from the terminal carbon atoms; and (c) said Component C is a mixture of water soluble salts of highly polar saturated aliphatic compounds each having two sulfur-containing moieties, one of which must be a sulfonate group attached to the terminal carbon atom and the other moiety selected from the group consisting of sulfonate and sulfate radicals attached to a carbon atom at least two carbon atoms removed from the terminal carbon atom, said compounds containing from about 10 to about 24 carbon atoms.

Other usual minor ingredients such as compatible optical brighteners, perfumes, dyes, pigments, soil suspending agents, fabric softeners, etc., can be incorporated, if desired, in the compositions of this invention in amounts up to a total of about 10%.

The compositions of this invention fall generally into two types. The first type of composition is primarily a detergent composition which also has antibacterial properties. These detergent compositions contain large amounts of zwitterionic detergents and large amounts of detergency builders and relatively small amounts of organic cations. The amount of chelating agent may vary widely, depending upon whether the chelating agent is to be used as a detergency builder as well as for its cooperative effect on bacteria. Compositions of this type contain from about 10% to about 50% chelating agent, from about 0.025% to about 2.5% organic compound capable of forming organic cations in aqueous solution, from about 20% to about 50% alkaline buffering salt, from 10% to about 40% zwitterionic detergent and optionally from about 1% to about 20% of compatible detergent as hereinbefore described. When used at conventional detergent levels, these compositions give a concentration of organic cation in solution which would be relatively ineffective by itself to kill bacteria, but which in combination with the other ingredients of this invention gives effective antibacterial action.

The cleaning-antibacterial solutions of this invention contain from about 200 p.p.m. to about 1000 p.p.m. chelating agent, from about 0.5 p.p.m. to about 50 p.p.m. organic cation, from about 400 p.p.m. to about 1000 p.p.m. alkaline buffering salt, and from about 200 p.p.m. to about 800 p.p.m. zwitterionic detergent.

The detergent compositions of this invention are particularly advantageous. The zwitterionic detergents of this invention are excellent detergents for use in cleaning fabrics under cool water conditions, e.g., from about 60° F. to about 90° F. Since these low temperatures are too low to provide effective antibacterial action, it is desirable that the detergent composition provide antibacterial action. The detergent compositions of this invention are therefore ideal for cool water washing of fabrics.

Another type of composition which is part of this invention is a composition which can be used primarily as an antibacterial agent. These composititons are usually utilized by diluting them to a point where the detergency effectiveness is considerably diminished. These compositions contain from about 1% to about 40% chelating agent, from about 0.1% to about 10% organic compound capable of forming organic cations in aqueous solution, from about 5% to about 40% alkaline buffering salt, and from about 1% to about 20% zwitterionic detergent. The solutions which are prepared using the above compositions will ordinarily contain from about 5 p.p.m. to about 200 p.p.m. chelating agent, from about 0.5 p.p.m. to about 50 p.p.m. organic cation, from about 20 p.p.m. to about 200 p.p.m. alkaline buffering salt, and from about 5 p.p.m. to about 100 p.p.m. zwitterionic detergent.

All the long alkyl chains of this invention normally are mixtures of long alkyl chains (e.g., R, $R^3$, $R^5$, $R^7$, $R^{11}$, $R^{13}$ and $R^{14}$). These can be derived from naturally occurring substances such as tallow and coconut oil, and can also be derived from petroleum fractions, e.g., by polymerizing propylene or cracking waxes to form the proper chain length, e.g., in the form of an olefin. The method of deriving the alkyl chain is immaterial. The alkyl chains can be unsaturated.

The following examples are illustrative and not limiting of the invention.

In the following tests, cidal activity was determined by applying the indicated concentrations of ingredients in water to 20 ml. of standard concentrations of the indicated bacteria. The final concentration of bacteria in the test mixture was generally of the order of $10^8$ cells/ml. The bacteria/bactericide mixture was incubated at 37° C. and after an exposure time of ten minutes, 1 ml. was removed from the mixture and diluted for plate counts of survivors in brain heart infusion agar except in the case of *Proteus mirabilis* in which case nutrient broth was used. The *P. mirabilis* plates were overlaid with a second layer of agar, to prevent spreading. The test organisms were *Staphylococcus aureus* (ATCC 6538, FDA strain 209), *Micrococcus lysodeikticus* (ATCC 4698), *Escherichia coli* (ATCC 10536), *P. mirabilis* and *Pseudomonas aeruginosa*.

EXAMPLE I

The relative effectiveness of various chelating agents in the compositions of this invention was determined in the following tests wherein 2.5 p.p.m. of dodecyldimethyl amine, 100 p.p.m. of sodium carbonate, and 20 p.p.m. of 3-(N,N - dimethyl-N-hexadecylammonio)-2-hydroxy propane-1-sulfonate were present in all of the tests. The test organism was *E. coli*.

TABLE 1

| Test No. | Chelating agent | P.p.m. | Percent survival | pH |
|---|---|---|---|---|
| 1 | $Na_2$ Ethylenediaminetetra-acetate (EDTA). | 100 | 0.076 | 9.6 |
| 2 | Methylene diphosphonate | 100 | 0.21 | 9.9 |
| 3 | $Na_3$ dibromo methylene diphosphonate. | 100 | 0.16 | 10.2 |
| 4 | $Na_4$ dichloro methylene diphosphonate. | 100 | 0.11 | 10.1 |
| 5 | Carbonyl diphosphonate | 100 | >5 | 9.9 |
| 6 | Propyl diphosphonate | 100 | >12 | 9.8 |
| 7 | Ethylidene diphosphonate | 100 | >12 | 9.9 |
| 8 | Benzyl methylene diphosphonate. | 100 | >12 | 9.8 |
| 9 | $Na_4$ hydroxyethane diphosphonate. | 100 | >5 | 10.1 |
| 10 | Na N,N-dihydroxyethyl-glycine. | 100 | >13 | 9.8 |
| 11 | $Na_3$ N'-hydroxyethylethylenediamine-triacetate. | 100 | 0.023 | 10.0 |
| 12 | $Na_5$ diethylenetriamine-pentaacetate. | 100 | 0.065 | 9.6 |
| 13 | $Na_2$ 1,2-diaminocyclohexane-N,N'-tetraacetate. | 100 | 0.031 | 10.1 |

In the following tests the indicated chelating agents were used with the same components as hereinbefore described except that the dodecyldimethylamine is replaced by dimethylalkylamine wherein the alkyl group contains 2% $C_{10}$, 66% $C_{12}$, 23% $C_{14}$ and 9% $C_{16}$ alkyl groups.

TABLE 2

| Test No. | Chelating agent | P.p.m. | Percent survival | pH |
|---|---|---|---|---|
| 14 | EDTA | 100 | 0.092 | 9.8 |
| 15 | $Na_3$ nitrilotriacetate (NTA) | 100 | 0.12 | 10.0 |
| 16 | Polymaleate (molecular weight of about). | 100 | 0.058 | 9.9 |

As can be seen from the above data many chelating agents which are quite effective at sequestering calcium are relatively ineffective in the present invention. There appear to be other factors involved than calcium sequestering ability which make it inadvisable to predict antibacterial effectiveness for the chelating agents.

When the above aqueous solutions are prepared by dissolving the corresponding anhydrous compositions (100 p.p.m.=about 45%; 20 p.p.m.=about 9%; and 2.5 p.p.m.=about 1% on an anhydrous basis) substantially equivalent results are obtained in that the aqueous solutions are effective antibacterial agents.

EXAMPLE II

In the following tests the effectiveness of various organic compounds which serve as sources of cations was determined. The organism used in these tests was again *E. coli* and the components in each test were 100 p.p.m. EDTA, 20 p.p.m. 3-(N,N - dimethyl - N - hexadecylammonio) - 2 - hydroxy propane - 1 - sulfonate (hereinafter referred to as HAPS), and, in some tests, 100 p.p.m. of sodium tripolyphosphate (hereinafter referred to as STP). Those tests in which STP was used are indicated by an asterisk.

TABLE 1

| Test No. | Organic compound capable of giving an organic cation | Molar conc. of organic compound | Percent survival | pH |
|---|---|---|---|---|
| 1 | n-Hexylamine | 1/20 | <0.005 | 7.9 |
| 2 | n-Octylamine | 1/20 | <0.005 | 9.2 |
|   |   | 1/2,560 | *0.002 | 8.1 |
| 3 | n-Decylamine | 1/80 | <0.008 | 8.8 |
| 4 | n-Dodecylamine | 1/5,120 (37.5 p.p.m.) | *<0.001 | 9.1 |
|   |   | 1/4,1000 4.5 p.p.m.) | *0.0028 | 9.0 |
|   |   | 1/82,000 | *0.021 |   |
| 5 | n-Hexadecylamine | 1/41,000 | *0.037 | 8.8 |
|   |   | 1/82,000 | *0.0049 |   |
| 6 | Methyl dodecylamine | 1/41,000 | *0.014 | 8.4 |
| 7 | Dimethyl dodecylamine (DDA). | 1/41,000 (5.2 p.p.m.) | *0.00006 | 8.7 |
|   |   | 1/82,000 (2.6 p.p.m.) | *0.0042 |   |
|   |   | 1/16,4000 | *0.021 |   |
| 8 | Dimethyl middle-cut coconut alkyl amine. | 1/82,000 | *0.012 | 7.9 |
| 9 | Dimethyl hexadecylamine | 1/41,000 | *0.015 | 8.6 |
|   |   | 1/82,000 | >0.4 |   |
| 10 | Dimethyl oleylamine | 1/41,000 | *0.022 | 8.3 |
|   |   | 1/82,000 | *>0.4 |   |
| 11 | Coco[1] 1,3 propylene diamine | 1/41,000 | *0.00028 | 8.6 |
|   |   | 1/82,000 | *0.0064 |   |
| 12 | Dodecyl piperidine | 1/41,000 | *~0.00002 | 8.7 |
|   |   | 1/82,000 | *0.0038 |   |
| 13 | Didecylamine | 1/41,000 | *>0.5 | 8.4 |
| 14 | N-Coco[1] morpholine | 1/41,000 | >0.9 | 8.8 |
|   |   | 1/82,000 | *>0.4 |   |

[1] Coco as used herein refers to a chain length distribution such as that derived from coconut oil.

In Table 2, the activities of some other organic cations are shown, and compared with their bactericidal activities when tested by themselves at the same pH (pH 10). The middle-cut coconut alkyl contains 2% $C_{10}$, 66% $C_{12}$, 23% $C_{14}$ and 9% $C_{16}$ alkyl groups.

TABLE 2

| Test No. | Test compound | P.p.m. | Percent survival With EDTA Na₂CO₃, HAPS | Control with Na₂CO₃, alone |
|---|---|---|---|---|
| 15 | N-cetyl pyridinum chloride. | 2.5 | 0.00 | |
| 16 | Dimethyldodecyl sulfonium iodide. | 2.5 | 0.0033 | 68 |
| 17 | 2-dodecyl-1,3-bis (trimethylammonio) propane dibromide. | 2.5 | 0.00074 | 43 |
| 18 | Dimethyldodecyl-3(trimethylammonio) proplyammonium dibromide. | 2.5 | 0.00095 | 59 |
| 19 | Dodecyltrimethylammonium bromide. | 2.5 | 0.0041 | 32 |
| 20 | 1-dodecyl-2-imino imidazolidine. | 1 | 0.0083 | 87 |
| 21 | 1-dodecyl-2-imino imidazolidine. | 2 | 0.135 | 30 |
| 22 | 1,2-bis(dimethylamino) dodecane. | 2.5 | 0.0017 | 70 |
| 23 | 2-chlorodimethy. dodecyl amine. | 2.5 | 0.11 | 54 |
| 24 | Polymerized epichlorohydrin (5 moles of monomer per molecule) quaternized with 3 moles of the middle-cut coconut alkyl amine of Test 9 in Table 1 of Example II per molecule. | 2.5 | 0.14 | 3.3 |
| 25 | Polymerized epichlorohydrin (5 moles of monomer per molecule) quaternized with 3 moles of the middle-cut coconut alkyl amine of Test 9 in Table 1 of Example II per molecule. | 5 | 0.00077 | 0.026 |
| 26 | Polymerized epichlorohydrin (5 moles of monomer per molecule) quaternized with 2 moles of decyl dimethylamine per molecule. | 2 | 0.017 | 3.8 |
| 27 | Alkyl (C₈–C₁₈) dimethyl benzylammonium chloride. | 2 | 0.11 | 29 |
| 28 | Alkyl (C₈–C₁₈) dimethyl benzylammonium chloride. | 5 | ~0.00003 | 0.0059 |
| 29 | Dodecyl dimethyl benzylammonium chloride. | 1 | 0.033 | 70 |
| 30 | do | 2 | 0.0087 | 7.9 |
| 31 | Tetradecyl dimethyl benzylammonium chloride. | 2 | 0.18 | 52 |
| 32 | Hexadecyl dimethyl benzylammonium chloride. | 5 | 4.6 | 8 |
| 33 | (2-Dimethylamino) dodecyl trimethyl ammonium iodide, HCl salt. | 1 | 0.0013 | >10 |
| 34 | 2-(Trimethylammonium chloride)-1-dimethyl-amino dodecane. | 2.5 | 0.0028 | 2.3 |

As can be seen from the above data there is a considerable variation in effectiveness depending upon the length of the alkyl chains and upon the type of cationic group which is present in the organic compounds of this invention. In general, it can be said that the effectiveness of the organic compounds is at a maximum when the long alkyl group contains 12 carbon atoms. Furthermore, the effectiveness drops off as the long alkyl group becomes smaller. A length of about 8 carbon atoms appears to be the borderline between extremely effective compounds and compounds having only average effectiveness. Similarly, if the long alkyl chain contains more than about 12 or 14 carbon atoms, the effectiveness begins to drop off and above 18 carbon atoms the activity is much less. Furthermore, compounds containing longer alkyl chains become considerably less soluble. It will be noted that compounds containing two long chain groups are much less effective than compounds containing only one long chain group.

The quaternary ammonium compounds are at least as effective as the corresponding amine compounds. However, it is a particular advantage of this invention that the amine compounds which are relatively ineffective by themselves at low concentrations can be used in the compositions of the present invention to produce effective antibacterial compositions. It will be noted that the effectiveness of the compositions varies quite widely depending upon the particular organic compounds used.

EXAMPLE III

The following tests were made using various alkaline buffering salts with 100 p.p.m. EDTA, 2.6 p.p.m. DDA and 20 p.p.m. HAPS. The organism used was $E.\ coli$.

| Test No. | Buffering agent | P.p.m. | Final pH | Percent survival |
|---|---|---|---|---|
| 1 | STP | 100 | 7.2 | 0.063 |
|   |     | 200 | 8.7 | 0.0071 |
| 2 | K₄P₂O₇ | 100 | 8.1 | 0.081 |
|   |        | 200 | 8.4 | 0.047 |
| 3 | Na₄P₂O₇ | 100 | 8.3 | 0.046 |
|   |         | 200 | 8.7 | 0.046 |
| 4 | Na₂HPO₄ | 100 | 7.3 | 0.11 |
|   |         | 200 | 7.7 | 0.086 |
| 5 | Na₃PO₄ | 100 | 10.2 | 0.0061 |
| 6 | Na₂CO₃ | 25 | 7.8 | 0.27 |
|   |         | 50 | 9.7 | 0.019 |
|   |         | 100 | 9.7 | 0.045 |

As can be seen from the above table the effectiveness of the compositions of this invention becomes generally greater as the pH increases. The effectiveness of STP is presumably due to its effectiveness as a chelating agent as well as an alkaline buffering salt.

EXAMPLE IV

In the following tests the effectiveness of various types of surfactants was determined in combination with 100 p.p.m. EDTA, 2.3 p.p.m. DDA and 100 p.p.m. STP. The pH in each test was from about 7 to about 11. The organism used in these tests was $E.\ coli$.

| Test No. | Surfactant | P.p.m. | Percent survival | pH |
|---|---|---|---|---|
| 1 | HAPS | 20 | 0.021 | 7.1 |
| 2 | Dimethyl hydrogenated tallow alkyl ammonioacetate. | 20 | 0.085 | 7.9 |
| 3 | Phosphine oxide | 20 | >1 | 8.6 |
| 4 | Dodecyldimethylamine oxide (DDAO). | 20 | >0.5 | 8.7 |
| 5 | Sodium tetrapropylene-benzene sulfonate. | 200 | >1 | 7.2 |

In the following tests 2.5 p.p.m. of DDA was used instead of 2.3 p.p.m. and 100 p.p.m. of sodium carbonate was used instead of 100 p.p.m. STP. The pH in these tests was about 10.

| Test No. | Surfactant | P.p.m. | Percent survival | Percent survival (surfactant alone) |
|---|---|---|---|---|
| 6 | Tween 80 | 100 | >17 | |
| 7 | 3-Hydroxy-4-decoxybutyl methyl sulfoxide. | 100 | >9 | |
| 8 | 2-(n-Octylmethylsulfonium) ethane sulfonate. | 20 | >12 | |
| 9 | Na N-methyl-N-carboxymethyldodecylamine. | 20 | >12 | |
| 10 | N,N-dimethyl dodecylammonio acetate. | 20 | >.21 | 94 |
| 11 | N,N-dimethyl hexadecylammonio propionate. | 20 | .0028 | 78 |
| 12 | N,N-dimethyl hydrogenated tallow ammonio acetate. | 20 | .0032 | 98 |
| 13 | N,N-dimethyl hexadecylammonio acetate. | 20 | .0005 | 98 |
| 14 | 2-Trimethylammonio stearate. | 20 | .0052 | 97 |

As can be seen from the above data the effectiveness of zwitterionic detergents is considerably greater than the effectiveness of other types of detergents.

EXAMPLE V

The following tests show that certain blends of organic cation-providing compounds which include antibacterial agents can be employed in compositions of this invention to provide increased effectiveness. Run number 7 shows outstanding effectiveness when an iodinium compound is employed with the compositions of this invention. The organism used in the following tests was E. coli.

| Test No. | P.p.m. | | | | | | Final pH | Percent survival |
|---|---|---|---|---|---|---|---|---|
| | EDTA[1] | DDA | Na₂CO₃ | HAPS | CPC[2] | CTAB[3] | | |
| 1 | 100 | 2.5 | 100 | 20 | | | 9.9 | 0.10 |
| 2 | 100 | 2.5 | 100 | 10 | | | 9.7 | 0.33 |
| 3 | 100 | 2.5 | 100 | 20 | 2.5 | | 9.8 | 0.0022 |
| 4 | 100 | 2.5 | 100 | 20 | | 2.5 | 9.7 | 0.031 |
| 5 | 100 | 2.5 | 100 | 10 | 2.5 | | 9.7 | 0.026 |
| 6 | 100 | 2.5 | 100 | 10 | | 2.5 | 9.7 | 0.055 |

| | EDTA | DDA | Na₂CO₃ | HAPS | CNOB[4] | Final pH | Percent Survival |
|---|---|---|---|---|---|---|---|
| 7 | 100 | 2.5 | 100 | 20 | 2 | 9.7 | 0.0043 |

[1] EDTA = ethylenediaminetetraacetate.
[2] CPC = cetyl pyridinium chloride.
[3] CTAB = cetyl trimethyl ammonium bromide.
[4] CNOB = 3-chloro-7-nitrodibenz(b,e)(1,4)oxiodinium bisulfate, As can be seen from the above data, addition of relatively small amounts of additional quaternary ammonium compounds and/or oxiodinium or other antibacterial compounds to the compositions of this invention as hereinbefore described gives a synergistically improved result.

When in the above example the following iodinium compounds and mixtures thereof in e.g., 1:1 ratios by weight, are substituted, either wholly or in part, for the CNOB, substantially equivalent results are obtained in that the solutions are effective antibacterial agents against gram negative bacteria.

bis(dibenziodolium) sulfate,
dibenziodolium bisulfate,
dibenziodolium lactate,
bis(2,4-dichlorodibenziodolium) sulfate,
bis(2-chlorodibenziodolium) sulfate,
bis(3-nitrodibenziodolium) sulfate,
3,7-dichloro-10-H-dibenz(be)iodinium bisulfate dihydrate,
2,4-dibromodibenziodolium bisulfate,
2-bromodibenziodolium lactate,
bis(3,7-difluorodibenziodolium) sulfate,
3,7-dibromo-10,11-dihydrodibenz(be)iodepinium dihydrogen phosphate,
bis(3-nitrobenzidolium) sulfate,
3,7-dinitro-10-H-dibenz(be)iodinium bisulfate,
3,7-dinitrodibenz(be)(1,4)oxiodinium bisulfate,
bis(3,7-dinitrodibenziodolium) sulfate,
bis(2-nitrodibenziodolium) sulfate,
3-chloro-7-nitrodibenz(be)(1,4)oxiodinium bisulfate,
bis[3-chloro-7-nitrodibenz(be)(1,4)oxiodinium]sulfate,
3,7-bis(trifluoromethyl)dibenziodolium iodide,
dibenziodolium 2,4,5-trichlorophenate,
2,4-diethoxydibenziodolium citrate,
3,7-dinitrodibenziodolium benzoate,
3,7-propyldibenziodolium acetate,
2-fluoro-10-H-dibenz(be)iodinium fluoride,
2-(perfluoromethyl)dibenziodolium bromide,
2-iodo-11,14-dihydro-10-H-dibenz(be)iodocinium phenate,
bis(3-chlorodibenziodolium)monohydrogen phosphate,
3-chloro-10,11-dihydrodibenz(be)iodepinium dihydrogen phosphate,
bis(3,7-dichlorodibenziodolium) sulfate,
3,7-dinitrodibenz(be)(1,4)oxiodinium bisulfate,
3,7-disulfamoyldibenz(be)(1,4)oxiodinium bisulfate,
1,3-dichloro-7-nitrodibenz(be)(1,4)oxiodinium bisulfate,
bis[1,3-dichloro-7-nitrodibenz(be)(1,4)oxiodinium] sulfate,
3,7-dinitrodibenz(be)(1,4)oxiodinium lactate,
3-bromo-7-nitrodibenz(be)(1,4)oxiodinium bisulfate,
bis[dibenz(be)(1,4)oxiodinium]sulfate,
3,7-diaminodibenz(be)(1,4)oxiodinium iodide,
1-chloro-3,7-diaminodibenz(b)(1,4)oxiodinium bisulfate,
bis[3,7-dichlorodibenz(be)(1,4)oxiodinium]sulfate
3,7-dibromodibenz(be)(1,4)oxiodinium chloride,
3-chlorodibenz(be)(1,4)oxiodinium chloride,
2-chlorodibenz(be)(1,4)oxiodinium bromide,
3,7-diethyldibenz(be)(1,4)oxiodinium chloride,
1,3-dichlorodibenz(be)(1,4)oxiodinium chloride,
2,3-dichlorodibenz(be)(1,4)oxiodinium bromide,
1-chlorodibenz(be)(1,4)oxiodinium chloride,
4-nitrodibenz(be)(1,4)thiaiodinium bisulfate, and
4,6-diamino(be)(1,4)thiaiodinium nitrate.

EXAMPLE VI

The following runs were made with P. mirabilis. The pH in these tests was about 10.

| Test No. | P.p.m. | | | | | | | | Percent survival |
|---|---|---|---|---|---|---|---|---|---|
| | EDTA | DDA | DTAB[5] | CTAB[3] | CPC[2] | Roccal[6] | Na₂CO₃ | HAPS | |
| 1 | 100 | 2.5 | | | | | 100 | 20 | 4.0 |
| 2 | 100 | | 2.5 | | | | 100 | 20 | 0.34 |
| 3 | 100 | | | 2.5 | | | 100 | 20 | 3.7 |
| 4 | 100 | | | | 2.5 | | 100 | 20 | 6 |
| 5 | 100 | | | | | 2.5 | 100 | 20 | 0.10 |
| 6 | | | 2.5 | | | | 100 | | 56 |
| 7 | | | | 2.5 | | | 100 | | 56 |
| 8 | | | | | 2.5 | | 100 | | 63 |
| 9 | | | | | | 2.5 | 100 | | 19 |

[5] DTAB = dodecyl trimethyl ammonium bromide.
[6] Roccal = alkyl (C₈-C₁₈) dimethyl benzyl ammonium chloride.

It can be seen from the above data that the effectiveness of various organic compounds varies according to the strain of organism to be killed. It will also be noted that contrary to results with other organisms the alkyldimethylbenzylammonium chloride is relatively ineffective against P. mirabilis by itself, whereas in combination with EDTA, Na₂CO₃ and HAPS, it is rather effective.

EXAMPLE VII

The following runs were made with E. coli. The systems contained 100 p.p.m. disodium ethylenediaminetetraacetate, 2.5 p.p.m. dodecyl dimethylamine, 100 p.p.m. Na₂CO₃ (pH 10), 20 p.p.m. C₁₆ HAPS, and the indicated concentrations of the indicated detergents. The pH in these tests was about 10.

| Test No. | Detergent | P.p.m. | Percent Survival |
|---|---|---|---|
| 1 | Sodium dodecyl (avg.) benzene sulfonate. | 100 | 42 |
| 2 | Dodecyl dimethylamine oxide | 100 | 0.0015 |
| 3 | Coconut alcohol/ethylene oxide (12 moles) condensate. | 500 | 1.6 |
| 4 | Olefin sulfonate as hereinbefore described. | 500 | 0.9 |

As can be seen from the above data, the compositions of this invention are fully compatible with semi-polar detergents such as trialkyl amine oxides, trialkyl phosphine oxides, and dialkyl sulfoxides and are at least partly compatible with conventional ethoxylated nonionic detergents and the olefin sulfonate hereinbefore described. The compositions of this invention are apparently not compatible with conventional anionic detergents.

EXAMPLE VIII

The utility of the compositions of this invention in a finished detergent product was further demonstrated using the following detergent formulation in comparative testing:

| Component | Percent by wt. |
|---|---|
| Coconut alcohol/ethylene oxide (12 moles) condensate. | 6 |
| 3-(N,N-dimethyl-N-coconut alkyl ammonio)-2-hydroxy propane-1-sulfate. | 6 |
| Potassium pyrophosphate | 20.3 |
| Sodium nitrilotriacetate | 5.2 |
| Sodium silicate ($SiO_2$:$Na_2O$; 2.58) | 2.8 |
| Resin (Gantrez AN119; maleic anhydride vinyl methyl ether). | 0.7 |
| Sodium carboxymethylcellulose | 0.7 |
| Potassium oxide | 0.8 |
| Optical brighteners and pigments | 0.32 |
| Water | Balance |

The product in solution has a pH of about 9.9. When this product was used at 1000 p.p.m. against *E. coli* there was 88% survival. However, when 2.5 p.p.m. of dodecyl dimethylamine was added to the product the survival rate was 0.13%. 2.5 p.p.m. of the amine by itself gave a survival of 21%. After addition the amine constituted 0.25% by weight of the composition.

When in the above example the following detergents are substituted either wholly or in part for the coconut alcohol/ethylene oxide condensate, substantially equivalent results are obtained in that the composition is an effective detergent composition having good antibacterial action:

dimethyldodecylamine oxide;
dimethyltetradecylamine oxide;
ethylmethyltetradecylamine oxide;
cetyldimethylamine oxide;
dimethylstearylamine oxide;
cetylethylpropylamine oxide;
diethyldodecylamine oxide;
diethyltetradecylamine oxide;
dipropyldodecylamine oxide;
bis-(2-hydroxyethyl)dodecylamine oxide;
bis-(2-hydroxyethyl)-3-dodecoxy-1-hydroxypropyl amine oxide;
(2-hydroxypropyl)methyltetradecylamine oxide;
dimethyloleylamine oxide;
dimethyl-(2-hydroxydodecyl)amine oxide;
dimethyldodecylphosphine oxide;
dimethyltetradecylphosphine oxide;
ethylmethyltetradecylphosphine oxide;
cetyldimethylphosphine oxide;
dimethylstearylphosphine oxide;
cetylethylpropylphosphine oxide;
diethyldodecylphosphine oxide;
diethyltetradecylphosphine oxide;
dipropyldodecylphosphine oxide;
bis-(hydroxymethyl)dodecylphosphine oxide;
bis-(2-hydroxyethyl)dodecylphosphine oxide;
(2-hydroxypropyl)methyltetradecylphosphine oxide;
dimethyloleylphosphine oxide;
dimethyl-(2-hydroxydodecyl)phosphine oxide;

and the corresponding decyl, hexadecyl and octodecyl homologs of the above compounds; nonyl phenol condensed with 10 or 30 moles of ethylene oxide per mole of phenol; propylene glycol condensed with propylene oxide to form a hydrophobic base which is then condensed with ethylene oxide, the hydrophobic base having a molecular weight of from 1500 to about 1800 and the total molecule having a molecular weight of 2,000, 3,000 or 8,000; ethylenediamine condensed with propylene oxide to form a hydrophobic group having a molecular weight of 2500 or 3,000, which are then condensed with ethylene oxide to give a molecular weight of either 5,000 or 11,000; dodecylphenol condensed with 12 moles of ethylene oxide phenol; dinonylphenol condensed with 15 moles of ethylene oxide per mole of phenol; dodecyl mercaptan condensed with 10 moles of ethylene oxide per mole of mercaptan; bis-(N-2-hydroxyethyl)lauramide; nonylphenol condensed with 20 moles of ethylene oxide per mole of nonylphenol; myristyl alcohol condensed with 10 moles of ethylene oxide per mole of myristyl alcohol; lauramide condensed with 15 moles of ethylene oxide per mole of lauramide; di-iso-octylphenol condensed with 15 moles of ethylene oxide; octadecyl methyl sulfoxide; dodecyl methyl sulfoxide; tetradecyl methyl sulfoxide; 3-hydroxytridecyl methyl sulfoxide; 3-methoxytridecy methyl sulfoxide; 3-hydroxy-4-dodecoxybutyl methyl sulfoxide; and mixtures thereof in e.g. 1:1 ratios.

When in the above example the following alkaline buffering salts are substituted either wholly or in part for the potassium pyrophosphate, substantially equivalent results are obtained in that the composition is an effective detergent composition having good antibacterial action: carbonates, bicarbonates, orthophosphates, monohydrogen orthophosphates, pyrophosphates, tripolyphosphates, metaphosphates,, silicates and mixtures thereof in e.g. 1:1 ratios in the form of the soduim, potassium and/or lithium salts.

All percent, ratios and parts herein are by weight unless otherwise specified.

EXAMPLE IX

The following composition is an effective antibacterial mouthwash.

| Component | Percent by Wt. |
|---|---|
| Glycerine | 10.0 |
| Ethyl alcohol | 16.5 |
| Flavor and artificial sweeteners | .208 |
| Ethylene oxide condensate with a fatty acid partial ester of a hexitol anhydride (Tween 80). | .12 |
| Disodium dihydrogen ethylene diamine tetra acetate. | .05 |
| 3 - [N,N - dimethyl - N - middle-cut-coconut-alkylammonio]-2-hydroxy propane - 1-sulfonate. | .03 |
| Cetylpyridinium chloride | .05 |
| Color | .05 |
| Water | Balance |

The pH was adjusted to about 9 with sodium hydroxide.
What is claimed is:
1. An antibacterial composition consisting essentially of:
(I) From about 1 to about 50 percent by weight of the total composition of a chelating agent selected from the group consisting of:
(A) ethylenediaminetetraacetates;
(B) methylenediphosphonates;
(C) dibromoethylenediphosphonates;
(D) dichloromethylenediphosphonates;
(E) N-hydroxyethylethylenediaminetriacetates;
(F) diethylenetriaminepentaacetates;
(G) 1,2, diaminocyclohexane-N,N'-tetraacetates;
(H) nitrilotriacetates;
(I) tripolyphosphates; and
(J) mixtures thereof, in the form of their water soluble salts;
(II) From about 0.1 to about 5 percent by weight of the total composition of organic compounds which form organic cations in aqueous solution, selected from the group consisting of:

(A) amines having the formula

wherein R is an alkyl radical containing from about 8 to about 18 carbon atoms and having as substituents from 0 to about 1 additional amine group having the formula

said amine group being attached so that there is one alkyl moiety of at least about 8 carbon atoms containing no amine group as a substituent, and from 0 to about 2 chlorine atoms and wherein each $R^1$ group is selected from the group consisting of hydrogen, alkyl groups containing from 1 to about 3 carbon atoms, mono chloro substituted alkyl groups containing from 1 to about 3 carbon atoms and hydroxy alkyl groups containing from 1 to about 3 carbon atoms;

(B) quaternary ammonium compounds having the formula

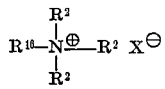

wherein $R^{16}$ is an alkyl radical containing from about 8 to about 18 carbon atoms and having as substituents from 0 to about 1 amine group having the formula

wherein $R^1$ has the definition hereinbefore given; from 0 to about 2 chlorine atoms, and from 0 to about 1 additional quaternary ammonium group having the formula

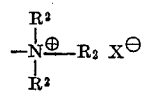

said amine group and said quaternary ammonium group being attached so that there is one alkyl moiety of at least about 8 carbon atoms containing no amine group or quaternary ammonium group as a substituent, and each $R^2$ group is selected from the group consisting of alkyl groups containing from 1 to about 3 carbon atoms, mono chloro substituted alkyl groups containing from 1 to about 3 carbon atoms, benzyl groups and hydroxyl alkyl groups containing from 1 to about 3 carbon atoms, and wherein X is selected from the group consisting of iodide, bromide, methosulfate, ethosulfate and chloride anions;

(C) N-alkyl pyridinium halides wherein the alkyl group contains from about 8 to about 18 carbon atoms;

(D) N-alkyl piperidines wherein the alkyl group contains from about 8 to about 18 carbon atoms;

(E) N-alkyl alkylene diamines wherein the alkyl group contains from about 8 to about 18 carbon atoms and the alkylene group contains from about 2 to about 4 carbon atoms;

(F) sulfonium compounds having the formula

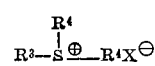

wherein $R^3$ is a hydrocarbon group containing from about 8 to about 18 carbon atoms, wherein each $R^4$ group is an alkyl group containing from 1 to about 3 carbon atoms, and wherein X has the definition hereinbefore given;

(G) 1-alkyl-2-imino imidazolidines wherein the alkyl group contains from about 8 to about 18 carbon atoms;

(H) polyquaternary ammonium compounds having the formula:

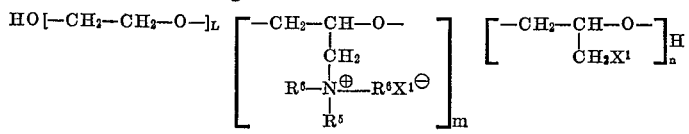

wherein $R^5$ is a hydrocarbon group containing from 1 to about 24 carbon atoms, wherein each $R^6$ group is a hydrocarbon group containing from 1 to about 4 carbon atoms, wherein $X^1$ is selected from the group consisting of chlorine, iodine, and bromine atoms, wherein L, $m$ and $n$ are integers such that L is an integer from 0 to about 50, the sum of $m$ and $n$ is from 2 to about 50, and the sum of $m$, $n$ and the number of carbon atoms in R is grater than 12; and (I) mixtures thereof;

(III) From 0 to about 50 percent by weight of the composition of an alkaline buffering salt selected from the group consisting of ammonium, sodium, potassium or lithium (1) carbonates, (2) bicarbonates, (3) orthophosphates, (4) monohydrogen orthophosphates, (5) pyrophosphates, (6) tripolyphosphates, (7) metaphosphates, (8) silicates having an $SiO_2:M_2O$ ratio of from about 1 to about 2.6 wherein M is sodium, potassium or lithium (9) hydroxides, (10) citrates, or (11) acetates and sufficient to maintain the pH of the composition at from about 7 to about 11 under usage conditions in aqueous solutions;

(IV) From about 1 to about 30 percent by weight of the total composition of a zwitterionic detergent selected from the group consisting of:

(A) compounds having the formula

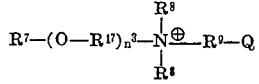

wherein $R^7$ is a hydrocarbon group containing from about 8 to about 18 carbon atoms, wherein $R^{17}$ is an alkylene group containing from 2 to 3 carbon atoms, wherein $n^3$ is a number 0 to about 3, wherein each $R^8$ group is selected from the group consisting an alkyl groups and hydroxyl alkyl groups said groups containing from 1 to about 3 carbon atoms, wherein $R^9$ is a saturated alkylene group containing from 1 to about 4 carbon atoms and from 0 to 1 hydroxy group attached to a secondary carbon atom, Q is selected from the group consisting of

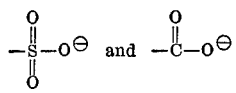

groups, and wherein $R^9$ contains no less than about 3 carbon atoms when Q is a sulfonate group;

(B) compounds having the formula

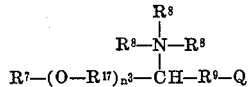

wherein $R^7$, $R^{17}$, $n^3$, $R^8$, $R^9$, and Q have the same definitions given hereinbefore and wherein $R^9$ contains no less than about 2 carbon atoms when Q is a sulfonate group; and (C) mixtures thereof;
there being sufficient of each of the above components present so that under usage conditions in aqueous solutions there will be at least about 0.0005 percent by weight of component I, about 0.00005 percent by weight of component II and about 0.0005 percent by weight of component IV 2. The composition of claim 1 containing as an additional ingredient from 1% to about 30% by weight of a compatible detergent selected from the group consisting of:

(A) a detergent having the formula $$[R^{11}-(OR^{18})_{n2}]R^{12}R^{12}N \to O$$

wherein $R^{11}$ is an alkyl group containing from about 10 to about 18 carbon atoms, from 0 to 1 methoxy group, and from 0 to about 2 hydroxy groups, $R^{18}$ is an alkylene group containing 2 or 3 carbon atoms, $n^2$ is a number from 0 to about 5, there being at least one moiety of $R^{11}$ which is an alkyl group containing at least about 10 carbon atoms and no substituent groups, and each $R^{12}$ is selected from the group consisting of alkyl radicals and hydroxyalkyl radicals containing from 1 to about 3 carbon atoms;

(B) a detergent having the formula $$[R^{11}(OR^{18})_{n2}]R^{12}R^{12}P \to O$$

wherein $R^{11}$, $R^{18}$, $n^2$, and $R^{12}$ have the same definitions given hereinbefore;

(C) nonionic detergents having the formula $$R^{13}(C_2H_4O)_xH_y$$

wherein $R^{13}$ represents a hydrophobic base which is derived from a hydrophobic compound bearing at least one active hydrogen atom, said hydrophobic compound selected from the group consisting of (1) alkanols containing from about 8 to about 20 carbon atoms, (2) alkyl phenols wherein the alkyl group contains from about 6 to about 18 carbon atoms, (3) condensation products of propylene glycol and propylene oxide having the formula

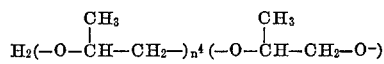

having a molecular weight of from about 1500 to about 1800, $n^4$ being a sufficiently large number to give the proper molecular weight, (4) fatty amides containing from about 10 to about 20 carbon atoms, (5) higher alkyl mercaptans containing from about 10 to about 20 carbon atoms, (6) condensation products of propylene oxide and ethylene diamine having the formula

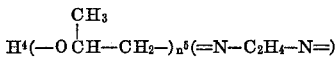

said condensation products constituting from about 20% to about 60% by weight of the finished nonionic detergent molecule and $n^5$ being a number which is sufficiently large to give the proper molecular weight of from about 5,000 to about 11,000 and (7) condensation products of fatty alcohols containing from about 10 to about 20 carbon atoms and from about 3 to about 8 propylene oxide units having the formula

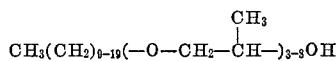

and mixtures thereof and wherein $x$ is an integer from about 4 to about 30 for (1), (2), (4) and (5), but not less than about 0.4 of the number of carbon atoms in the hydrophobic base, and wherein $x$ is sufficiently large to give the detergent a molecular weight of from about 2,000 to about 10,000 for (3), of from about 5,000 to about 11,000 for (6) and of from about 750 to about 1800 for (7) and wherein $y$ is an integer equal to the number of ethylene oxide chains formed by replacing the active hydrogen atoms on said hydrophobic compounds;

(D) a detergent having the formula

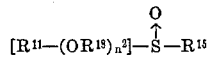

wherein $R^{11}$, $R^{18}$, and $n_2$ have the definitions given hereinbefore, and wherein $R^{15}$ is an alkyl radical containing from 1 to 3 carbon atoms and from one to two hydroxyl groups; and (E) mixtures thereof.

3. The composition of claim 1 containing as an additional ingredient from about 0.04% to about 1% by weight of an additional antibacterial agent having the formula

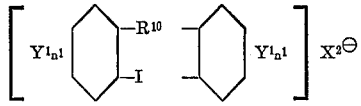

wherein $R^{10}$ is selected from the group consisting of oxygen, sulfur, and $-(CH_2)_{m1}-$, $m^1$ being an integer from 0 to 3; wherein each $Y^1$ represents a radical selected from the group consisting of chloro, bromo, iodo, fluoro, and nitro groups; alkyl radicals containing up to 3 carbon atoms; chloro, bromo, iodo, and fluoro substituted alkyl radicals containing up to 3 carbon atoms the substituents being on any carbon atom; unsubstituted amino groups; and unsubstituted sulfamyl groups; each $n^1$ represents an integer selected from the group consisting of 0, 1 and 2, and when an $n^1$ is 2, the corresponding $Y^1$ radicals can be dissimilar and wherein $X^2$ is selected from the group consisting of sulfate, bisulfate, lactate, phosphate, iodide, 2,4,5-trichlorophenate, acetate, bromide, fluoride, chloride, benzoate, citrate, phenate, dihydrogen phosphate, monohydrogen phosphate, and nitrate anions.

4. The composition of claim 1 suitable for use as a detergent composition which contains from about 10% to about 50% by weight of the chelating agent; from about 0.025% to about 2.5% by weight of the organic compound capable of forming an organic cation in aqueous solution; from about 20% to about 50% by weight of the alkaline buffering salt and from about 10% to about 40% by weight of the zwitterionic detergent.

5. The composition of claim 1 containing from about 1% to about 40% of the chelating agent; from about 1% to about 10% of the organic compound capable of forming an organic cation in aqueous solution; from about 5% to about 40% of the alkaline buffering salt; and from about 1% to about 20% of the zwitterionic detergent.

6. A cleaning solution prepared from the composition of claim 4 and consisting essentially of from about 0.02% to about 0.1% of the chelating agent; from about 0.00005% to about 0.005% of the organic cation in aqueous solution; from about 0.04% to about 0.1% of the alkaline buffering salt; from about 0.02% to about 0.08% of the zwitterionic detergent and the balance water.

7. An antibacterial solution prepared from the composition of claim 5 consisting essentially of from about 0.0005% to about 0.02% of the chelating agent; from about 0.00005% to about 0.005% of the organic cation; from about 0.002% to about 0.02% of the alkaline buffering salt; from about 0.0005% to about 0.01% of the zwitterionic detergent and the balance water.

References Cited

UNITED STATES PATENTS

| | | | |
|---|---|---|---|
| 2,933,529 | 4/1960 | Hwa | 252—106 XR |
| 3,050,521 | 8/1962 | Niederhauser | 252—106 XR |
| 3,196,184 | 7/1965 | Berry | 252—106 XR |
| 3,213,030 | 10/1965 | Diehl | 252—152 |
| 3,244,636 | 4/1966 | Reller | 252—107 |

MAYER WEINBLATT, Primary Examiner

P. E. WILLIS, Assistant Examiner

U.S. Cl. X.R.

252—137